(12) United States Patent
Sethi et al.

(10) Patent No.: US 11,029,938 B1
(45) Date of Patent: Jun. 8, 2021

(54) SOFTWARE UPDATE COMPATIBILITY ASSESSMENT

(71) Applicant: Dell Products L.P., Round Rock, TX (US)

(72) Inventors: Parminder Singh Sethi, Ludhiana (IN); Mohammad Rafey, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/691,972

(22) Filed: Nov. 22, 2019

(51) Int. Cl.
  *G06F 8/65* (2018.01)
  *G06F 9/451* (2018.01)
  *G06N 5/04* (2006.01)
  *G06N 20/00* (2019.01)

(52) U.S. Cl.
  CPC ............... *G06F 8/65* (2013.01); *G06F 9/451* (2018.02); *G06N 5/04* (2013.01); *G06N 20/00* (2019.01)

(58) Field of Classification Search
  USPC ........................................................ 717/169
  See application file for complete search history.

(56) References Cited

U.S. PATENT DOCUMENTS

| | | | | |
|---|---|---|---|---|
| 8,209,564 B2 * | 6/2012 | Vidal | ................... | G06F 11/0715 714/38.1 |
| 10,310,842 B1 * | 6/2019 | Miller | ....................... | G06F 8/65 |
| 10,754,638 B1 * | 8/2020 | Dwivedi | ............... | H04L 67/025 |
| 2007/0088630 A1 | 4/2007 | MacLeod et al. | | |
| 2007/0234293 A1 | 10/2007 | Noller et al. | | |
| 2008/0301668 A1 | 12/2008 | Zachmann | | |
| 2017/0034023 A1 | 2/2017 | Nickolov et al. | | |
| 2019/0171438 A1 * | 6/2019 | Franchitti | ............... | G06N 5/022 |
| 2019/0391800 A1 * | 12/2019 | Lin | ......................... | H04L 67/34 |

OTHER PUBLICATIONS

Abhishek Sharma; "Multivariate Regression"; GeeksforGeeks.org website [full url in ref.]; Dec. 2, 2018 (Year: 2018).*

* cited by examiner

*Primary Examiner* — Wei Y Zhen
*Assistant Examiner* — Clint Thatcher
(74) *Attorney, Agent, or Firm* — Ryan, Mason & Lewis, LLP

(57) ABSTRACT

A method includes identifying at least one software update available for a given computing device, determining a state of the given computing device, and utilizing a machine-learning based predictive model to assess compatibility of the at least one software update with the given computing device based at least in part on the state of the given computing device, the machine learning-based predictive model being trained utilizing historical incident data for a plurality of incidents associated with application of software updates to a plurality of computing devices. The method also includes generating a recommendation notification indicating compatibility of the at least one software update with the given computing device, and providing the recommendation notification in conjunction with presentation of one or more user interface features controlling whether to apply the at least one software update to the given computing device.

20 Claims, 11 Drawing Sheets

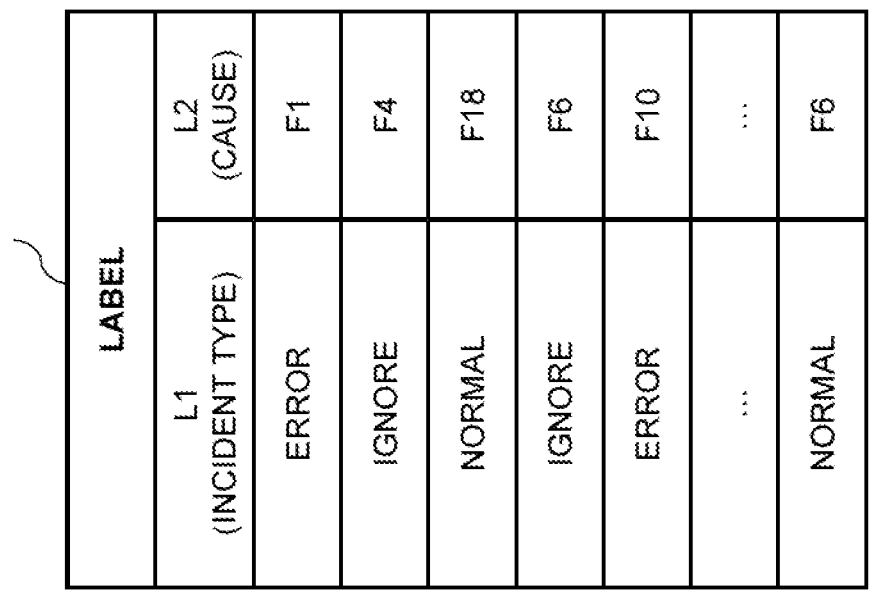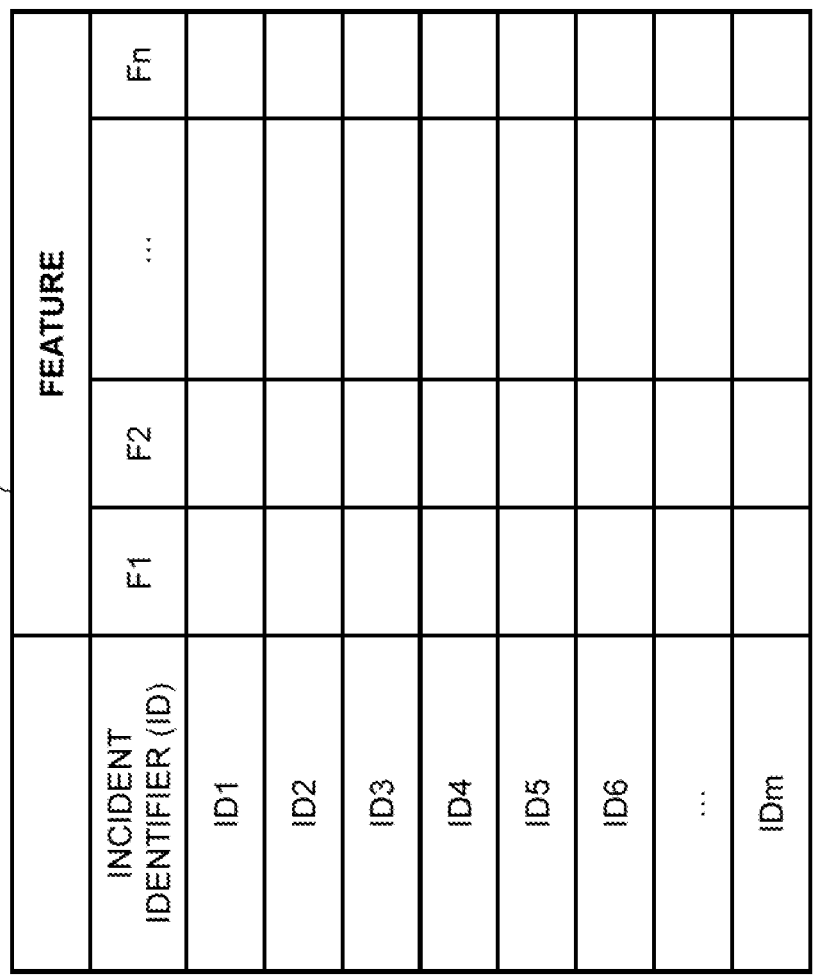
FIG. 4

* Process:
* Included Applications:

| Name | Publisher | Size | Summary | Install Date | URL Information |
|---|---|---|---|---|---|
| oxygen-cursor-themes-4.3.4-30.el6_6 | Red Hat, Inc. | 18736888 bytes | Oxygen cursor themes | Wed Mar 30 2016 | http://www.kde.org/ |
| mtdev-1.1.2-5.el6 | Red Hat, Inc. | 31166 bytes | Multitouch Protocol Translation Library | Wed Mar 30 2016 | http://bitmath.org/code/mtdev/ |
| redhat-indexhtml-6-6.el6 | Red Hat, Inc. | 1773604 bytes | Browser default start page for Red Hat Enterprise Linux | Wed Mar 30 2016 | (none) |
| python-dateutil-1.4.1-6.el6 | Red Hat, Inc. | 336476 bytes | Powerful extensions to the standard datetime module | Wed Mar 30 2016 | http://labix.org/python-dateutil |
| xml-common-0.6.3-33.el6 | Red Hat, Inc. | 20624 bytes | Common XML catalog and DTD files | Wed Mar 30 2016 | http://www.w3.org/2003/entities/ |
| util-linux-ng-2.17.2-12.18.el6 | Red Hat, Inc. | 6075042 bytes | A collection of basic system utilities | Wed Mar 30 2016 | ftp://ftp.kernel.org/pub/linux/utils/util-linux-ng |
| perl-IO-Compress-Bzip2-2.021-141.el6 | Red Hat, Inc. | 60217 bytes | Perl interface to allow reading and writing of bzip2 data | Wed Mar 30 2016 | http://www.perl.org/ |
| pcmciautils-015-4.2.el6 | Red Hat, Inc. | 105689 bytes | PCMCIA utilities and initialization programs | Wed Mar 30 2016 | https://www.kernel.org/pub/linux/utils/kernel/pcmcia/pcmcia.html |
| libuser-python-0.56.13-5.el6 | Red Hat, Inc. | 69464 bytes | Python bindings for the libuser library | Wed Mar 30 2016 | https://fedorahosted.org/libuser/ |
| mailcap-2.1.31-2.el6 | Red Hat, Inc. | 53077 bytes | Helper application and MIME type associations for file types | Wed Mar 30 2016 | http://git.fedoraproject.org/git/mailcap.git |
| sssd-common-1.12.4-47.el6 | Red Hat, Inc. | 2245015 bytes | Common files for the SSSD | Wed Mar 30 2016 | http://fedorahosted.org/sssd/ |
| perl-HTML-Tagset-3.20-4.el6 | Red Hat, Inc. | 19624 bytes | HTML::Tagset - data tables useful in parsing HTML | Wed Mar 30 2016 | http://search.cpan.org/dist/HTML-Tagset/ |
| gnome-user-share-2.28.2-3.el6 | Red Hat, Inc. | 1146008 bytes | Gnome user file sharing | Wed Mar 30 2016 | http://www.gnome.org |
| system-config-keyboard-base-1.3.1-6.el6 | Red Hat, Inc. | 456765 bytes | system-config-keyboard base components | Wed Mar 30 2016 | https://fedorahosted.org/system-config-keyboard/ |

SOFTWARE UPDATE COMPATIBILITY ASSESSMENT

FIELD

The field relates generally to information processing, and more particularly to techniques for managing software.

BACKGROUND

Performing software updates is an important aspect of support and servicing of computing devices. When a new version of a piece of software running on a particular computing device becomes available, a publisher of the software may generate and send a notification to a user of the computing device indicating that the new version of the software is available for installation. Installation of software updates indicated as compatible for the computing device, however, may in some cases result in issues that negatively affect the performance of the computing device. Thus, significant challenges can arise in the management of software for computing devices, particularly as the number of computing devices being managed increases.

SUMMARY

Illustrative embodiments of the present disclosure provide techniques for managing software by assessing the compatibility of software updates for computing devices and generating recommendations as to whether software updates should be installed on particular ones of the computing devices.

In one embodiment, an apparatus comprises at least one processing device comprising a processor coupled to a memory. The at least one processing device is configured to perform steps of identifying at least one software update available for a given computing device, determining a state of the given computing device, utilizing a machine learning-based predictive model to assess compatibility of the at least one software update with the given computing device based at least in part on the state of the given computing device, the machine learning-based predictive model being trained utilizing historical incident data for a plurality of incidents associated with application of software updates to a plurality of computing devices, generating a recommendation notification indicating compatibility of the at least one software update with the given computing device, and providing the recommendation notification in conjunction with presentation of one or more user interface features controlling whether to apply the at least one software update to the given computing device.

These and other illustrative embodiments include, without limitation, methods, apparatus, networks, systems and processor-readable storage media.

BRIEF DESCRIPTION OF THE DRAWINGS

FIG. 4 shows training data for building the predictive model for assessing software updates and generating recommendations for whether to install the software updates in an illustrative embodiment.

FIG. 5 shows information regarding applications installed on a computing device in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
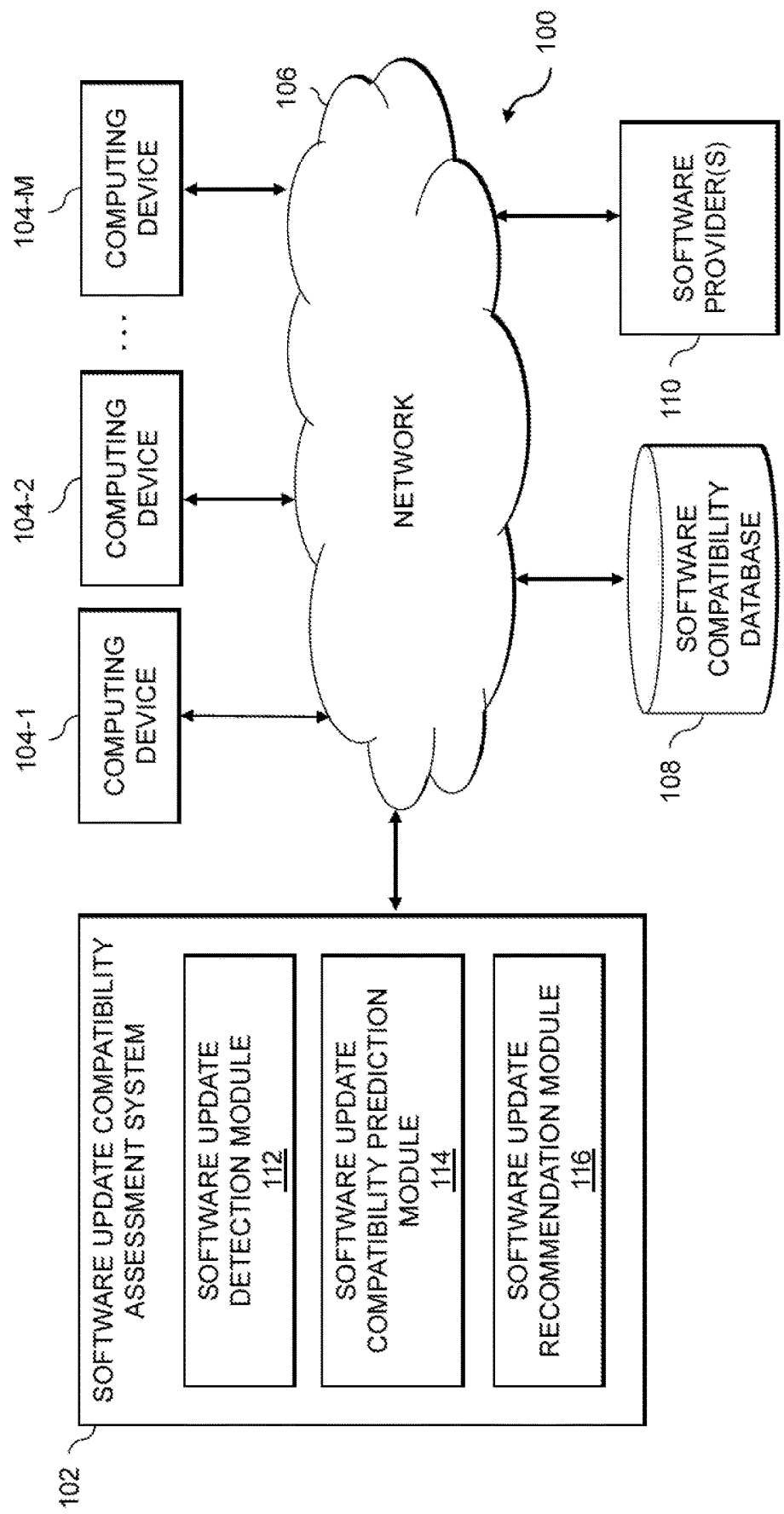
FIG. 1 is a block diagram of an information processing system for managing software by assessing the compatibility of software updates in an illustrative embodiment.

FIG. 1 shows an information processing system 100 configured in accordance with an illustrative embodiment. The information processing system 100 is assumed to be built on at least one processing platform and provides functionality for managing software through a software update compatibility assessment system 102 that assesses the compatibility of software updates by one or more software providers 110 for software running on computing devices 104-1, 104-2, . . . 104-M (collectively, computing devices 104). The software update compatibility assessment system 102, computing devices 104 and software providers 110 are coupled to a network 106. Also coupled to the network 106 is a software compatibility database 108, which may store various information relating to software update compatibility as will be described in further detail below.

The software update compatibility assessment system 102 is configured to generate recommendations as to whether particular software updates should or should not be installed on particular ones of the computing devices 104 based at least in part on assessing the compatibility of those software updates with the computing devices 104. The software running on the computing devices 104 include, but are not limited to, operating systems (OSes) and components thereof, applications, device drivers, etc. The software updates include, but are not limited to, installation of new software or new version of existing software, patching existing software, removal of existing software and possible replacement with different software, etc. The software providers 110 are assumed to be publishers or other distributors of the software that generate software updates for software running on the computing devices 104.

When one of the software providers 110 determines that a particular piece of software running on one of the computing devices 104 has one or more software updates available, that software provider 110 may provide a notification to that computing device 104 indicating the availability of the software updates. In some embodiments, such notifications are provided from the software providers 110 directly to the computing devices 104 over the network 106. The computing devices 104 can then invoke or otherwise request a recommendation from the software update compatibility assessment system 102 for determining whether to apply one or more of the software updates in the software update notification received from the software provider 110. In other embodiments, the software update notifications may be provided from the software providers 110 directly to the software update compatibility assessment system 102 over the network 106, with the software update compatibility assessment system 102 then generating and providing software update recommendations to the computing devices 104 over the network 106.

The computing devices 104 may comprise, for example, physical computing devices such as Internet of Things (IoT) devices, mobile telephones, laptop computers, tablet computers, desktop computers or other types of devices, in any combination. Such devices are examples of what are more generally referred to herein as "processing devices." Some of these processing devices are also generally referred to herein as "computers." The computing devices 104 may also or alternately comprise virtualized computing resources, such as virtual machines (VMs), containers, etc.

The computing devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The software compatibility database 108, as discussed above, is configured to store and record information relating to software compatibility with particular types of the computing devices 104. For example, the information may include state information of the computing devices 104 including but not limited to running processes, installed applications, available resources, environment information, system uptime, installed hardware components, etc. The information may also include incident data for the computing devices 104, classification results for the historical incident data, training data for one or more machine learning-based classifiers of incident data, etc.

The software compatibility database 108 in some embodiments is implemented using one or more storage systems or devices associated with the software update compatibility assessment system 102. In some embodiments, one or more of the storage systems utilized to implement the software compatibility database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the software update compatibility assessment system 102, the computing devices 104, the software compatibility database 108, and the software providers 110, as well as to support communication between the software update compatibility assessment system 102, the computing devices 104, the software compatibility database 108, the software providers 110 and other related systems and devices not explicitly shown.

Although shown as a separate element in this embodiment, the software update compatibility assessment system 102 in other embodiments can be implemented at least in part within one or more of the computing devices 104, or as part of another system coupled to the network 106 such as a threat detection and remediation system, a security operations center (SOC), a governance, risk and compliance (GRC) system, etc.

The software update compatibility assessment system 102 in the FIG. 1 embodiment is assumed to be implemented using at least one processing device. Each such processing device generally comprises at least one processor and an associated memory, and implements one or more functional modules for controlling certain features of the software update compatibility assessment system 102. In the FIG. 1 embodiment, the software update compatibility assessment system 102 comprises a software update detection module 112, a software update compatibility prediction module 114 and a software update recommendation module 116.

The software update detection module 112 is configured to identify at least one software update available for a given one of the computing devices 104. In some embodiments, this involves receiving a request from the given computing device 104 for a software update advisory or recommendation for one or more software updates provided by one or more of the software providers 110. In other embodiments, one or more of the software providers 110 may provide software update notifications for the computing devices 104 to the software update compatibility assessment system 102.

The software update compatibility prediction module 114 is configured to determine a state of the given computing device 104, and to utilize a machine learning-based predictive model to assess compatibility of the at least one software update with the given computing device 104 based at least in part on the state of the given computing device 104. The machine learning-based predictive model is trained utilizing historical incident data for a plurality of incidents associated with application of software updates to the computing devices 104.

The software update recommendation module 116 is configured to generate a recommendation notification indicating compatibility of the at least one software update with the given computing device 104, and to provide the recommendation notification in conjunction with presentation of one or more user interface features controlling whether to apply the at least one software update to the given computing device 104. This may include, by way of example, providing a visual indicator in association with information regarding availability of the software update, with the visual indicator denoting the predicted compatibility of the at least one software update with the given computing device 104. The software update compatibility assessment system 102 may provide the recommendation notification directly to the given computing device 104, to a user or operator of the given computing device 104 (via the given computing device 104 or one or more other computing devices associated with the user or operator), to IT staff or other authorized personnel responsible for managing the given computing device 104, etc. The recommendation notification (e.g., a visual indicator thereof) may itself be a selectable user interface feature which, when selected, provides detailed information regarding the predicted compatibility of the at least one software update with the given computing device 104.

In some embodiments, the computing devices 104 may implement host agents that are configured for communication with the software update compatibility assessment system 102 and the software providers 110. As noted above, the software providers 110 may generate software update notifications that are sent to the computing devices 104, and the software update compatibility assessment system 102 is configured to generate recommendation notifications that are sent to the computing devices 104 advising whether particular software updates should or should not be applied. The host agents implemented by the computing devices 104 may be configured to receive such notifications or other alerts and appropriately respond to them. For example, the host agents implemented by the computing devices 104, on receiving software update notifications from the software providers 110, may automatically generate requests for recommendations from the software update compatibility assessment system 102 to determine whether software updates should be applied.

The recommendations from the software update compatibility assessment system 102 may be used to "augment" the presentation or indication of availability of the software updates to the users of the computing devices 104. Such augmentation may include, by way of example, an indication of whether the software update is recommended. This may include providing a visual indicator of the potential impact of installing a software update. In some embodiments, the visual indicators are color-based (e.g., red, yellow, green, etc.) with the different colors representing potential impact of installing the software updates. In other embodiments, however, the size of the visual indicator may be used to represent the potential impact of installing the software updates, or the visual indicator may include a numerical or letter grade score of the potential impact of installing the software updates. It should be appreciated that various other types of visual indicators may be used as desired, including combinations of the above-described visual indicators. The visual indicator may also be a user interface feature that the user may select to learn more about the recommendation and potential impact of installing the software updates.

In some embodiments, the host agents implemented by the computing devices 104 may perform such actions in a manner that is transparent to users of the computing devices 104 (e.g., without requiring users to explicitly request the recommendation notifications from the software update compatibility assessment system 102). In other embodiments, the host agents implemented by the computing devices 104 only request the recommendation notifications from the software update compatibility assessment system 102 when prompted by the users of the computing devices 104, or in accordance with one or more policies. For example, users of the computing devices 104 may generate whitelists and blacklists of different ones of the software providers 110. Software update notifications from software providers 110 on the whitelists may be presented to the users of the computing devices 104 without first obtaining recommendation notifications from the software update compatibility assessment system 102, though the users may manually request recommendation notifications from the software update compatibility assessment system 102 if desired with the recommendation notifications being used to augment the presentation of the software update notifications to the users of the computing devices 104. Software update notifications from software providers 110 on the blacklists may first be provided to the software update compatibility assessment system 102 to obtain recommendation notifications before presenting the software update notifications augmented with the recommendations to the users of the computing devices 104.

It should be noted that in other embodiments, different types of policies may be used for determining whether and when to automatically request recommendation notifications from the software update compatibility assessment system 102. In some embodiments, for example, one or more factors may be considered, including but not limited to: the amount of time since the last software update for a particular piece of software; the amount of time since the last software update from the associated software provider; the criticality or importance of the software being updated; the severity or extent of the software update; etc.

The recommendation notifications generated by the software update compatibility assessment system 102 may also or alternatively be provided to a system administrator, information technology (IT) manager, or other authorized personnel responsible for managing the computing devices 104 of a particular enterprise system (via host agents on devices associated with such authorized personnel). The authorized personnel may use the recommendation notifications to control whether users of the computing devices 104 are permitted to install the software updates.

It should be noted that a "host agent" as this term is generally used herein may comprise an automated entity, such as a software entity running on a processing device. Accordingly, a host agent need not be a human entity.

It is to be appreciated that the particular arrangement of the software update compatibility assessment system 102, the software update detection module 112, the software update compatibility prediction module 114 and the software update recommendation module 116 illustrated in the FIG. 1 embodiment is presented by way of example only, and alternative arrangements can be used in other embodiments. As discussed above, for example, the software update compatibility assessment system 102, the software update detection module 112, the software update compatibility prediction module 114 and the software update recommendation module 116 may in some embodiments be implemented internal to one or more of the computing devices 104. As another example, the functionality associated with the software update detection module 112, the software update compatibility prediction module 114 and the software update recommendation module 116 may be combined into one module, or separated across more than three modules with the multiple modules possibly being implemented with multiple distinct processors or processing devices.

At least portions of the software update detection module 112, the software update compatibility prediction module 114 and the software update recommendation module 116 may be implemented at least in part in the form of software that is stored in memory and executed by a processor.

It is to be understood that the particular set of elements shown in FIG. 1 for managing software by assessing the compatibility of software updates is presented by way of illustrative example only, and in other embodiments additional or alternative elements may be used. Thus, another embodiment may include additional or alternative systems, devices and other network entities, as well as different arrangements of modules and other components.

By way of example, in other embodiments, the software update compatibility assessment system 102 may be implemented as part of a threat detection and remediation system, a SOC, a GRC system, one or more devices associated with a system administrator, IT manager, or other authorized personnel that manages an enterprise system comprising the computing devices 104 and controls whether users of the computing devices 104 are permitted to install software updates, etc.

The software update compatibility assessment system 102 and other portions of the system 100 may be part of cloud infrastructure as will be described in further detail below.

The software update compatibility assessment system 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The computing devices 104 and software update compatibility assessment system 102 or components thereof (e.g., the software update detection module 112, the software update compatibility prediction module 114 and the software update recommendation module 116) may be implemented on respective distinct processing platforms, although numerous other arrangements are possible. For example, in some embodiments at least portions of the software update compatibility assessment system 102 and one or more of the computing devices 104 are implemented on the same processing platform. A given computing device (e.g., 104-1) can therefore be implemented at least in part within at least one processing platform that implements at least a portion of the software update compatibility assessment system 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the software update compatibility assessment system 102, the computing devices 104, the software compatibility database 108 and the software providers 110, or portions or components thereof, to reside in different data centers. Numerous other distributed implementations are possible. The software update compatibility assessment system 102 or portions thereof can also be implemented in a distributed manner across multiple data centers.

Additional examples of processing platforms utilized to implement the software update compatibility assessment system 102 and other portions of the system 100 in illustrative embodiments will be described in more detail below in conjunction with FIGS. 9 and 10.

It is to be appreciated that these and other features of illustrative embodiments are presented by way of example only, and should not be construed as limiting in any way.

An exemplary process for managing software by assessing the compatibility of software updates will now be described in more detail with reference to the flow diagram of FIG. 2. It is to be understood that this particular process is only an example, and that additional or alternative processes for managing software by assessing the compatibility of software updates may be used in other embodiments.

In this embodiment, the process includes steps 200 through 208. These steps are assumed to be performed by the software update detection module 112, the software update compatibility prediction module 114 and the software update recommendation module 116. The process begins with step 200, identifying at least one software update available for a given computing device. The at least one software update may comprise at least one of installing new software, upgrading existing software, patching existing software, removing existing software, and replacing existing software with different software. The at least one software update may be for at least one of an operating system of the given computing device, a system component of the given computing device, a device driver of the given computing device, and an application installed on the given computing device. Step 200 may include receiving at least one software update notification from a software provider indicating that the at least one software update is available and compatible with a device model of the given computing device. Alternatively, the at least one software update notification may be received from the given computing device.

In step 202, a state of the given computing device is determined. Step 202 may include collecting various information from the given computing device or one or more monitoring tools that monitor the given computing device. Such information may include one or more processes running on the given computing device, software installed on the given computing device, hardware installed for the given computing device, etc. Such information may also or alternatively include central processing unit (CPU) utilization by the given computing device, memory utilization by the given computing device, storage utilization by the given computing device, network utilization by the given computing device, etc.

A machine learning-based predictive model is utilized in step 204 to assess compatibility of the at least one software update with the given computing device based at least in part on the state of the given computing device. The machine learning-based predictive model is trained utilizing historical incident data for a plurality of incidents associated with application of software updates to a plurality of computing devices. The machine learning-based predictive model may comprise a multi-variate logistic regression classifier configured to assign a classification to an incident comprising application of a software update to an associated computing device based at least in part on a set of two or more features representing the state of the associated computing device.

Figure 2:
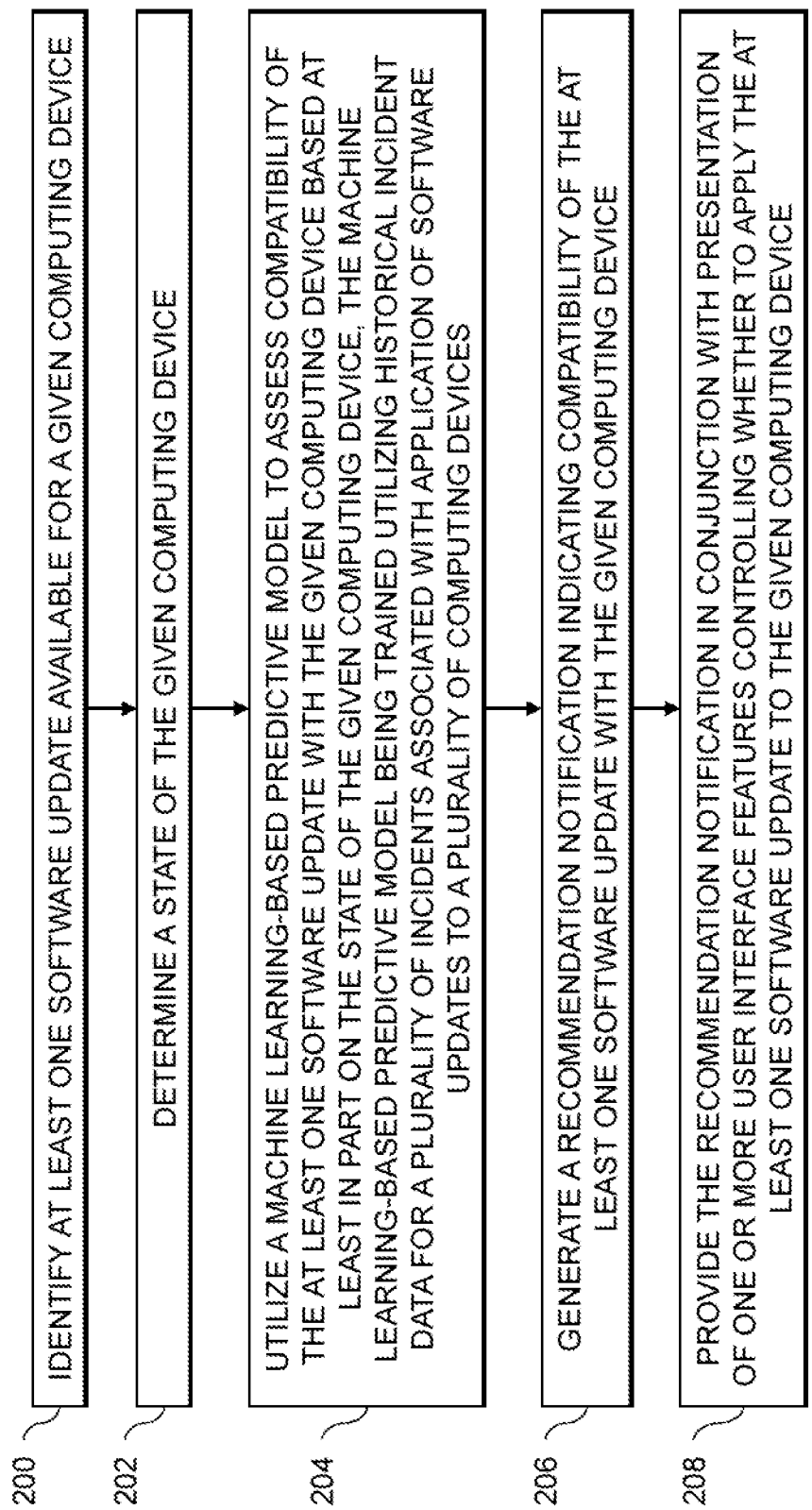
FIG. 2 is a flow diagram of an exemplary process for managing software by assessing the compatibility of software updates in an illustrative embodiment.

The FIG. 2 process continues with step 206, generating a recommendation notification indicating compatibility of the at least one software update with the given computing device. In step 208, the recommendation notification is provided in conjunction with presentation of one or more user interface features controlling whether to apply the at least one software update to the given computing device. Step 208 may include displaying a visual indicator of the assessed compatibility of the at least one software update with the given computing device. The visual indicator may comprise a user interface feature which, when selected, provides information regarding the assessed compatibility of the at least one software update with the given computing device. The visual indicator may comprise a warning indicator responsive to the assessed compatibility of the at least one software update with the given computing device having at least a designated threshold probability of negatively affecting operation of the given computing device. The designated threshold probability may be dynamically adjusted based at least in part on one or more of a severity of the at least one software update, a criticality of the at least one software update, and an importance of software that is updated by the least one software update. In some embodiments, step 208 includes providing the recommendation notification to the given computing device. In other embodiments, step 208 includes providing the recommendation notification to an additional computing device of a user responsible for managing software of the given computing device.

Software update, as the term is used herein, is intended to be construed broadly. For example, software updates include installation of software, upgrading software, applying patches to software, etc. Software updates are an important part of customer or user support and servicing of computing devices. When a new version of an application, device driver, component or other software is available, the software provider notifies computing devices that new versions or more generally new software is available for installation. Device management tools, such as support assistance tools, may be used to manage the upgrading or other updating of different applications or other software running on a particular computing device. As part of this management, the support assistance tools will generate notifications for delivery to a user of the computing device. It should be noted that the term "user" is intended to be construed broadly, and that the notifications may be delivered to the user via the computing devices running the software to be updated, to the user via one or more out-of-band communication channels (e.g., one or more other computing devices associated with the user), etc. Further the "user" of the computing device in some embodiments is IT staff or other authorized personnel responsible for managing the computing device. The notifications provide information regarding the availability of software updates for different applications or other software installed on the computing devices.

Available upgrades or other updates for software may be made available to the user of the computing device based at least in part on the device model of the user's computing device. If an application or other software vendor or provider has marked that a specific device model is compatible for a given software update, then the support assistance tool will inform the user that the given software update is available. Support assistance tools, however, may report a significant number of incidents whose root cause is the incompatibility of software updates. In such cases, an incident results from a software update being applied to a computing device that is indicated as compatible with the software update by the software provider. Despite being marked as compatible for the device models by the software provider, the software update nevertheless may cause one or more issues or incidents on computing devices that apply the software update. Such issues or incidents may affect performance of the computing device (e.g., causing slowdowns, application failure, system errors, system crashes, etc.). Different types of issues or incidents may be associated with distinct incident types or classifications as will be described in further detail below.

There is thus a need for proactive, intelligent advice to users about possible compatibility issues arising from applying software updates. In some approaches, advice is provided in the form of manual documentary information, which the user typically must seek out on its own and thus may or may not read through. Further, manual documentary information is often difficult for some users to understand, as the users may not be technologically competent. Further, there is a need for providing feed forward advice to future users based on insights obtained from previous application of software updates. This helps to avoid issues and errors that are detected in later stages when the software updates are already installed or applied. Resolution procedures initiate when the user either reports an issue or incident, or an automated detection mechanism reports the issue or incident.

In illustrative embodiments, the software update compatibility assessment system 102 is configured to intelligently analyze historical incident data (e.g., for historical errors encountered during or after applying software updates) to understand error symptoms and possible causes (e.g., to determine when software updates cause incidents). The software update compatibility assessment system 102 is configured to use machine learning techniques for training a predictive model to provide proactive advice or recommendations on whether to accept or reject software updates for computing devices 104.

Figure 3A:
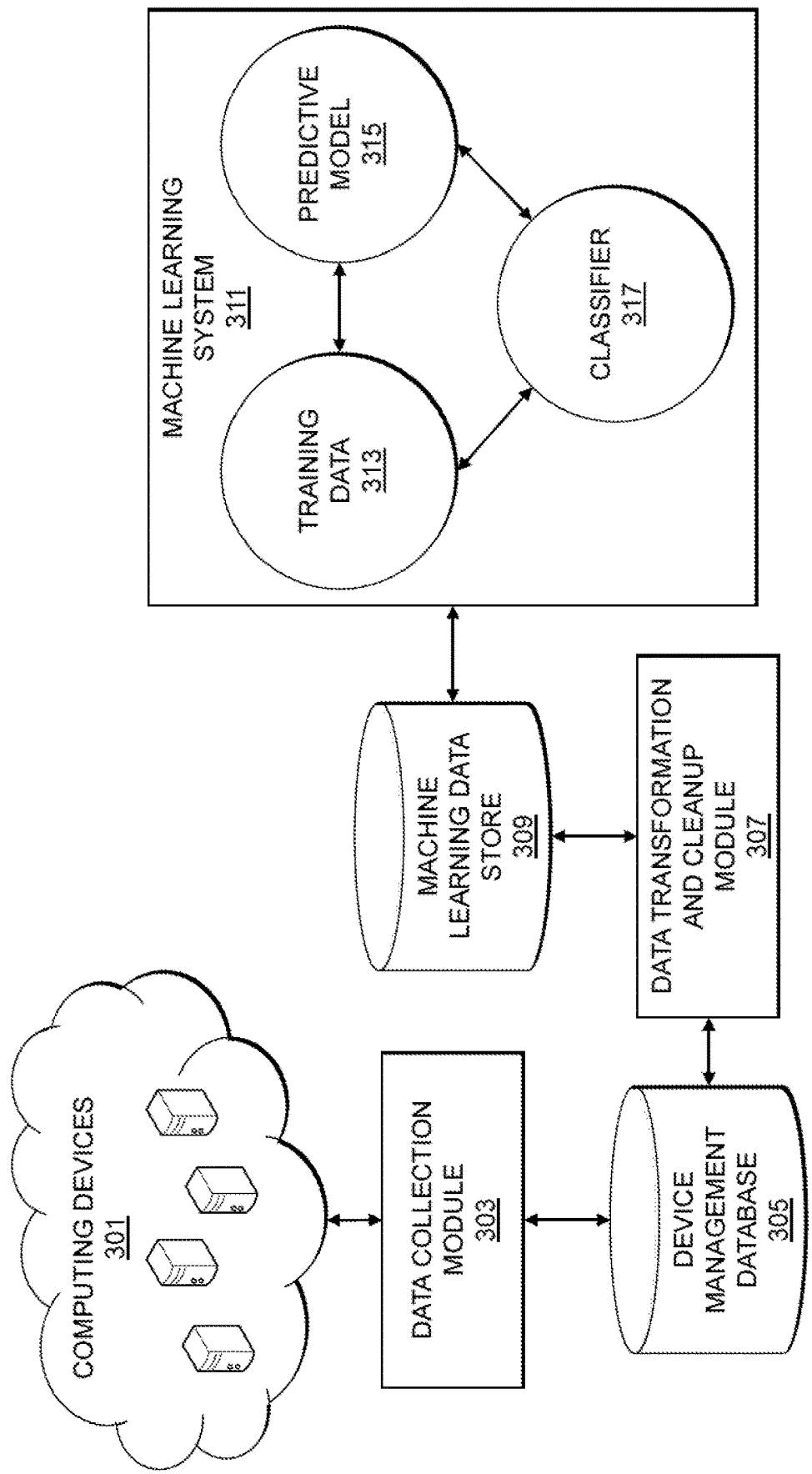
FIGS. 3A and 3B show a system flow for building and using a predictive model to assess software updates and generate recommendations for whether to install the software updates in an illustrative embodiment.
Figure 3B:
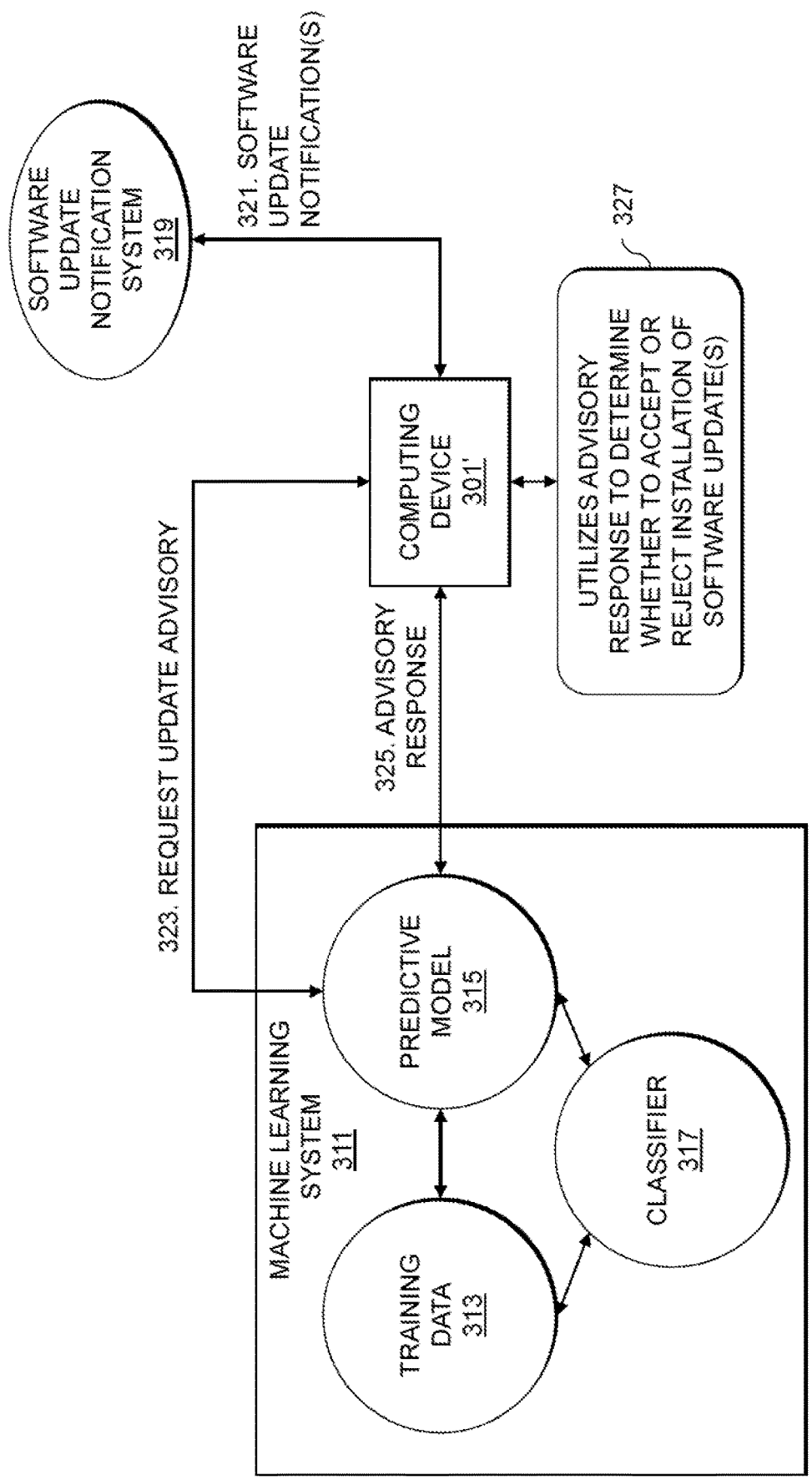

FIGS. 3A and 3B show a system flow for building and using a predictive model to assess software updates and generate recommendations for whether to install the software updates. More particularly, FIG. 3A depicts a first stage, where the system (e.g., software update compatibility assessment system 102) leverages an existing datastore that contains historical error data and its root cause analysis details. FIG. 3B depicts a second stage, where the system provides proactive user advisories or recommendations on software updates to intelligently assist users in determining whether to install or reject software updates (e.g., based on the past performance of the software updates on other computing devices). Advantageously, the user advisories or recommendations enable users to determine when to forego installation of software updates to avoid potential issues, thus saving time and resources necessary for costly resolution processes for remedying issues after they occur.

As shown in FIG. 3A, a set of computing devices 301 provide information to a data collection module 303. The information may include, but is not limited to, information associated with installed software updates, state of the computing devices 301 when the software updates were installed, issues or incidents encountered by the computing devices 301 after installation of the software updates, root cause analysis for the issues or incidents encountered by the computing devices 301 after the installation of the software updates, etc. The computing devices 301 are examples of computing devices 104 in the system 100. The data collection module 303 provides such information collected from the computing devices 301 to a device management database 305. A data transformation and cleanup module 307 may apply various processing to the collected data stored in the device management database 305 to prepare such data for use in one or more machine learning algorithms. The processed data is stored in the machine learning data store 309. The device management database 305 and machine learning data store 309 may form a portion of the software compatibility database 108 in the system 100. The data transformation and cleanup module 307 performs various processing such that the collected data is suitable for use by a machine learning system 311 as training data 313. The machine learning system 311 implements a cyclic online learning process, where the training data 313 is used for training a predictive model 315 and classifier 317. The classifier 317 may be a multi-variate logistics regression classifier configured to classify the training data 313 into one of N classes.

FIG. 3B shows how the machine learning system 311 provides proactive intelligent device-specific alerts or recommendation notifications to a computing device 301'. It should be appreciated that the computing device 301' in some embodiments is one of the computing devices 301 that provides data used to train the machine learning system 311. In other embodiments, however, the computing device 301' may be distinct from the set of computing devices 301 that provides data used to train the machine learning system 311. A software update notification system 319 provides software update notifications 321 to the computing device 301'. The software update notification system 319 may be operated by one or more software providers, by a manufacturer or seller of the computing device 301', by an enterprise system or service thereof that manages the computing device 301', etc. The software update notifications 321 are provided from the software update notification system 319 to the computing device 301' on detecting software updates that are available for software that is installed on the computing device 301'. In response, the computing device 301' requests an update advisory 323 from the predictive model 315 of the machine learning system 311.

The machine learning system 311 utilizes the predictive model 315 to generate an advisory response 325 that is sent to the computing device 301'. The advisory response 325 is assumed to comprise a recommendation for whether to install or reject one or more of the software updates in the software update notifications 321, based at least in part on whether the predictive model 315 of the machine learning system 311 determines that such software updates are compatible with the computing device 301'. This determination may be based on a state of the computing device 301', which may be provided to the predictive model 315 as part of the requested update advisory 323. Determining that the software update is compatible with the computing device 301' may include, but is not limited to, determining that the probability of the software updates causing one or more issues or incidents on the computing device 301' is lower than a designated threshold. The designated threshold may be set by the computing device 301' or a user thereof, and may also be included in the requested update advisory 323. In some embodiments, the designated threshold is preset by the machine learning system 311, by IT staff or other authorized personnel managing the computing device 301', etc. The designated threshold may also be dynamically adjusted based on determining a criticality or importance of the computing device 301', based on the software that is being updated, etc. The computing device 301' utilizes the advisory response 325 to determine whether to accept or reject installation of the software updates in the software update notifications 321 in block 327.

FIG. 4 shows an example of training data for building the predictive model 315. More particularly, FIG. 4 shows a first table 401 with feature data F1, F2, ... Fn (collectively, features F) representing parameters of a device state of one or more computing devices at respective points in time associated with incident identifiers (IDs) ID1, ID2, ... IDm. The features F may represent parameters such as memory consumption, disk utilization, system events, error logs, application performance indicators, lists of installed software (e.g., installed applications, device drivers, system components, etc.), etc. The features F are designed to capture detail so that the device state of the computing devices may be re-created at the time of the incidents. The feature data table 401 is formatted for feeding into a machine learning model for predicting the outcome in one of a set of categories based on the n features F.

FIG. 4 also shows a table 403 for labeling the incidents shown in table 401. The table 403 may be populated by running the feature data for each of the incident IDs through the classifier 317 of the machine learning system 311. Each incident ID has an associated level 1 (L1) incident type (e.g., one of error, ignore and normal as described in further detail below) and a level 2 (L2) feature cause for that incident. In the FIG. 4 embodiment, table 403 shows the L2 cause as a single feature. In other embodiments, however, the L2 cause may identify two or more of the features F, or there may be multiple levels of causes. For example, the L2 cause may represent the feature that contributes greatest to the labeling of a particular incident ID as one of the L1 incident types, with additional levels (e.g., a level 3 (L3) cause, a level 4 (L4) cause, etc.) identifying other ones of the features F that contribute to the labeling of a particular incident ID as one of the L1 incident types.

The outcome or L1 incident type, in some embodiments, is one of error, ignore and normal. The error category or classification may be used to denote incidents that result in system crashes or other serious errors such as prolonged or permanent slowdown of the computing device (e.g., slowdowns that extend beyond a first designated threshold period of time), abnormal spikes in feature conditions (e.g., processor usage, memory usage, disk utilization, etc. that are outside associate threshold ranges). The ignore category or classification may be used to denote incidents that result in temporary degraded performance or slowdowns in operation of the computing device (e.g., slowdowns that are less than the first designated threshold period of time, but greater than a second designated threshold period of time). The ignore category may be used to represent application of software updates that represent "normal" spikes in feature conditions (e.g., processor usage, memory usage, disk utilization, etc. that increases within associated threshold ranges) for a duration between the first and second designated threshold periods of time. The normal category or classification may be used to denote incidents that do not substantially affect performance or operation of the computing device (e.g., incidents with slowdowns less than the second designated threshold period of time, performance where the features conditions do not spike or reach associated thresholds that trigger an ignore classification, etc.).

FIG. 5 shows information 500 collected from a computing device that is used to populate one or more of the features F in table 401. The information 500 more particularly includes a list of applications that are installed on the computing device, along with details regarding such applications such as their names, publisher, size, summary of functionality, installation date, and a uniform resource locator (URL) for additional information regarding the application.

Figure 6:
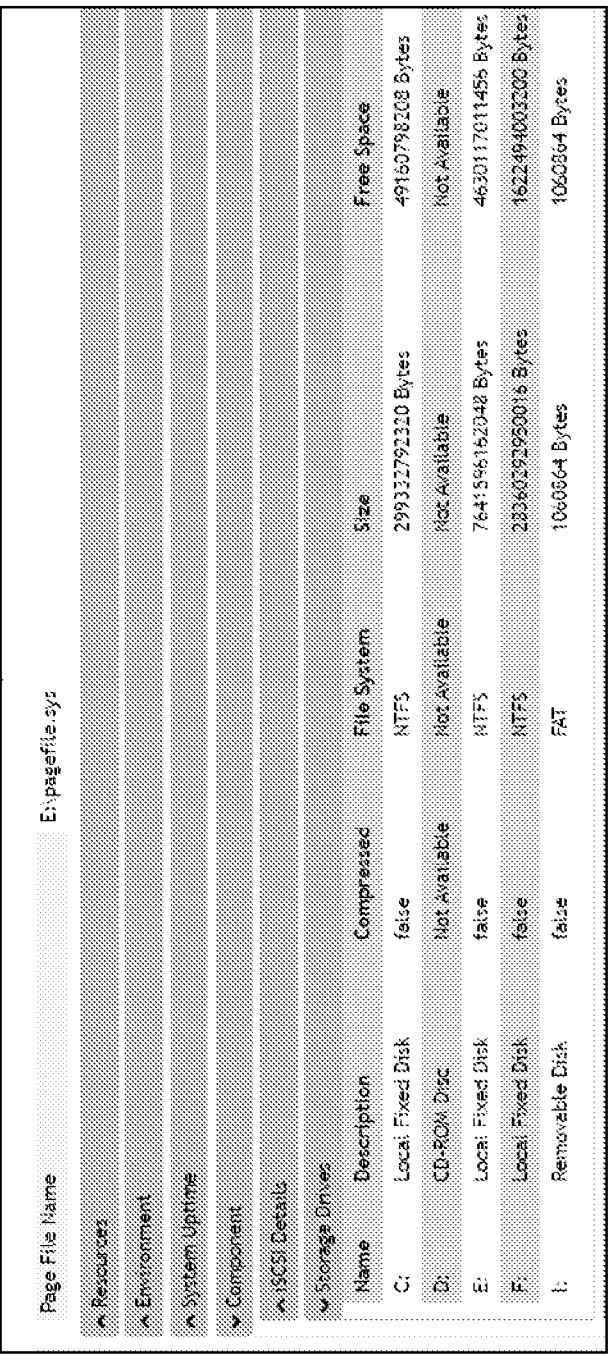
FIG. 6 shows information regarding configuration of storage drives of a computing device in an illustrative embodiment.

FIG. 6 shows additional information 600 collected from a computing device that is used to populate one or more of the features F in table 401. The information 600 more particularly includes a list of storage drives of the computing device, along with details regarding the storage devices such as their name (e.g., drive letter), description, whether they are compressed, an associated filesystem, a size and free space.

It should be appreciated that the information 500 and 600 shown in FIGS. 5 and 6 is presented by way of example only, and that various other information may be collected from a given computing device to populate one or more of the features F in table 401. For example, FIG. 5 shows a view of information 500 with an "Installed Applications" list expanded and a "Processes" list not expanded. Additional information may be collected from the "Processes" list regarding processes that are running on the given computing device, as well as information such as central processing unit (CPU) or other processor utilization by such processes, memory utilizations by the processes, descriptions of the processes, etc. Similarly, FIG. 6 shows a view of information where a "Storage Drives" list is expanded and other lists for other types of components such as an "Internet Small Computer Systems Interface (iSCS) Details" list is not expanded. Still further, other lists such as a "Resources," "Environment," "System Uptime," etc. may be expanded to show additional information that may be collected from a given computing device to populate one or more of the features F of table 401.

Figure 7:
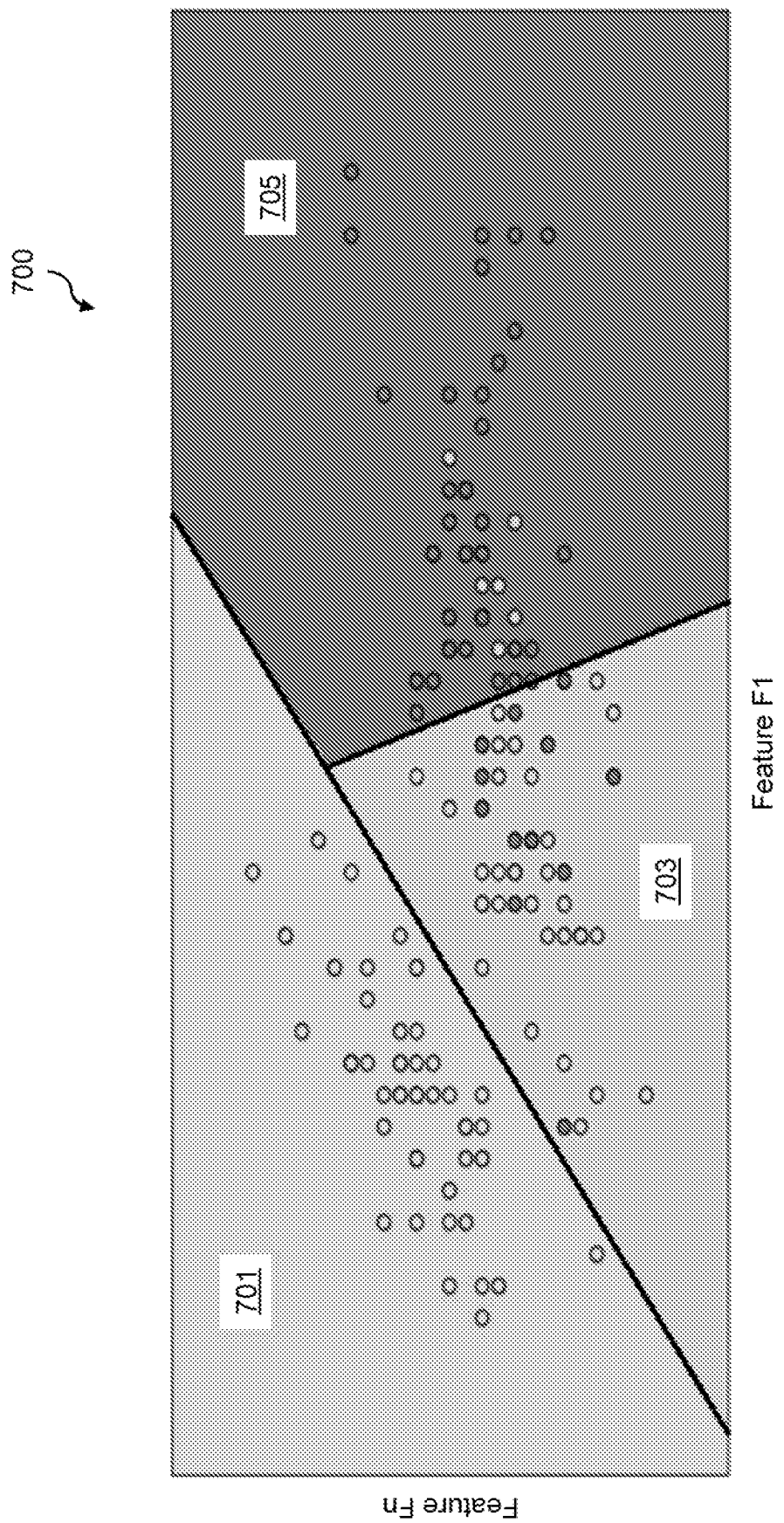
FIG. 7 shows a plot illustrating multi-label classification of incidents using two features and three categories according to an embodiment of the invention.

FIG. 7 shows a plot 700 using two features F1 and Fn, where sample data is plotted into one of three regions 701, 703 and 705 corresponding to the normal, ignore and error categories described above. Each data point corresponds to the values of features F1 and Fn, and shows where an incident with such values would be classified into the normal region 701, the ignore region 703 or the error region 705. In the FIG. 7 example, the classifier 317 is implemented using logistics regression (e.g., an N classifier with multi-variate logistics regression where N is three corresponding to the above-described categories of normal, ignore and error).

It should be appreciated, however, that the number of categories or classifications is not limited to three (e.g., the classifier 317 may classify incidents into more or fewer than three categories. In some embodiments, the classifier 317 classifies each incident as either normal or an error, and does not use the ignore class. In other embodiments, the classifier 317 classifies each incident as being one of a set of levels that grade potential impact (e.g., from no impact, minor impact, medium impact, major impact, etc.). Various other types and numbers of classifications may be used as desired.

Figure 8:
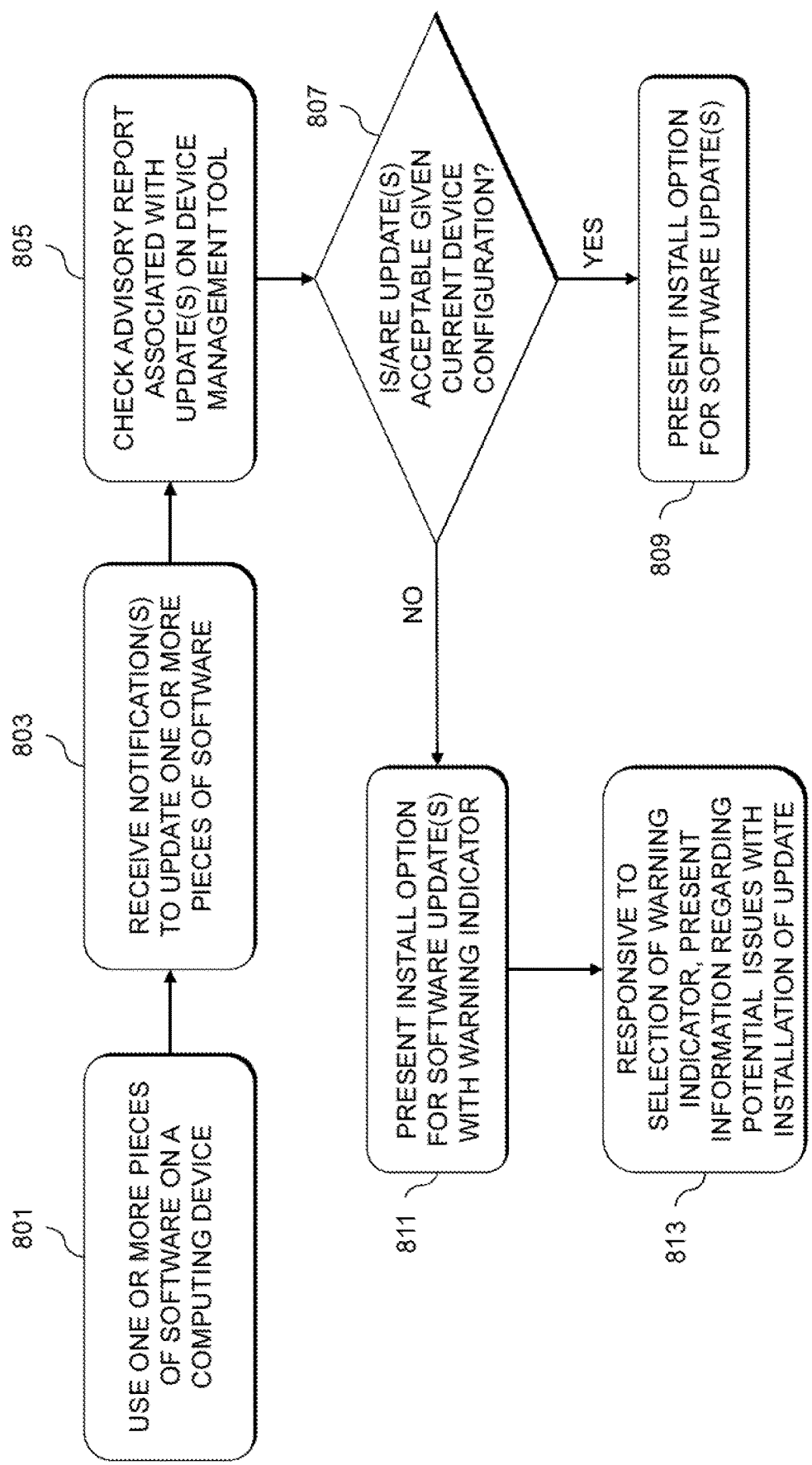
FIG. 8 is a flow diagram of a process on a computing device for determining whether to install software updates in an illustrative embodiment.

FIG. 8 shows a process flow from the perspective of a given computing device (e.g., one of computing devices 104, the computing device 301', etc.). The process flow begins in step 801, where the computing device is using one or more pieces of software (e.g., one or more applications, device drivers, OSes, system components, etc.). In step 803, the computing device receives one or more notifications to update one or more pieces of software (e.g., a notification regarding the availability of updates for one or more applications installed on the computing device). In step 805, the computing device checks an advisory report associated with the software updates from a device management tool (e.g., checks an advisory report or recommendation notification from the software update compatibility assessment system 102, from the predictive model 315 of the machine learning system 311, etc.).

In step 807, a determination is made as to whether the software updates are acceptable given a current configuration of the computing device. The current configuration of the computing device, for example, may be provided as part of the request for the advisory report. If the result of the step 807 determination is yes, the process proceeds with step 809 where an install option is presented to enable the computing device to install the software updates. The install option may be presented (e.g., possibly along with a visual indicator that there are no potential compatibility issues or that the likelihood of compatibility issues is below some designated threshold, etc.) via one or more user interface features allowing a user of the computing device to install the updates, or may trigger automatic installation of the software updates (e.g., without requiring user input). It should be appreciated that the "automatic installation" of the software updates may be triggered immediately, or according to some designated schedule (e.g., where software updates are automatically installed outside of normal business hours or overnight to avoid disrupting use of the computing device). Further, the computing device may be programmed to automatically install or reject the updates if the user has not rejected them via the one or more user interface features within some designated threshold period of time (e.g., the software updates are first presented via the one or more user interface features, and are then automatically installed or rejected upon expiration of the designated threshold period of time).

The choice of whether the software updates are automatically installed or first presented via one or more user interface features may be based at least in part on one or more policies. For example, the computing device may set policies that for software updates having no potential compatibility issues or where potential compatibility issues are not likely to occur in accordance with some defined threshold likeliness, the software updates may be automatically installed. The choice of whether the software updates are automatically installed or first presented via one or more user interface features may also or alternatively be based at least in part on a severity of the software updates (e.g., whether the software updates require restart of the computing device, an estimated time required to install the software updates, etc.). The choice of whether the software updates are automatically installed or first presented via one or more user interface features may further or alternatively be based at least in part on a criticality of the software updates or the software being updated. For example, software updates that patch security vulnerabilities may be installed automatically, where software updates that add or upgrade functionality may be presented to the user via the one or more user interface features. As another example, software updates for software that have a designated threshold user importance (e.g., in accordance with user-defined importance, or enterprise-wide importance for computing devices of an enterprise system) or functional importance (e.g., to operation of the computing device, such as device drivers, OS components, etc.) may be treated differently (e.g., installed automatically, presented to the user via one or more user interface features, etc.) as desired.

If the result of the step 807 determination is no, the process flow proceeds to step 811, where installation options for the software updates are presented along with a warning indicator. The warning indicator is illustratively a visual indicator that one or more of the software updates has potential compatibility issues (e.g., is likely to negatively affect performance or operation of the computing device as described elsewhere herein). The particular threshold at which potential compatibility issues are presented along with the warning indicator may be user-defined, or based on various factors in a manner similar to that described above with respect to step 809 and the choice of whether software updates are presented via one or more interface features or are automatically installed (e.g., user-defined or enterprise-defined policies, severity of the software updates, criticality of the software updates or the software being updated, etc.). The warning indicator, in some embodiments, may vary based on the degree of the potential compatibility issues (e.g., different visual warning indicators may be used for potential compatibility issues that are likely to crash the system or computing device, for potential compatibility issues that are likely to slow down performance of the computing device, for potential compatibility issues that are likely to affect other software on the computing device, etc.).

In some embodiments, the warning indicator presented in step 811 is itself a user-selectable interface feature which, when selected, presents information regarding the potential compatibility issues with the software updates in step 813. The information regarding the potential compatibility issues may comprise information regarding the likelihood of the potential compatibility issues, how the potential compatibility issues are likely to affect performance (e.g., by crashing the system, causing slowdowns, leading to issues with other installed software, etc.). The user of the computing device is then enabled to either reject or install the software updates.

It should be appreciated that in some embodiments, step 807 may be repeated for each of two or more software updates individually (e.g., such that steps 807 through 813 are repeated for each individual software update that is indicated as available in the software update notifications received in step 803). In other embodiments, step 807 may be performed for two or more software updates collectively (e.g., such that steps 807 through 813 are performed once for the two or more software updates). In some cases, performing step 807 for multiple software updates at once may be desirable, particularly where the advisory report checked in step 805 provides information regarding potential compatibility associated with performing the two or more updates at the same time, or in a designated sequence. For example, it is possible that two individual software updates present no compatibility issues when considered alone, but that performing the two individual software updates at the same time or in a particular order is likely to present compatibility issues. When step 807 considers multiple software updates collectively, the install option presented in step 809 or step 811 may indicate an order in which to apply the software updates so as to avoid potential compatibility issues, or may indicate that only one of a set of two or more software updates should be installed to avoid potential compatibility issues, etc.

Illustrative embodiments advantageously provide the ability to determine potential compatibility of software updates with respect to the current state or configuration of computing devices. If a software provider indicates that software updates are available for some specific version of a computing device (e.g., a particular type of laptop or desktop, a particular operating system or application version, a particular driver version, etc.), a device management tool such as the software update compatibility assessment system 102 is configured to determine the compatibility of such software updates considering the current state or configuration of the computing devices (e.g., memory, disk or other storage space, installed software, device drivers, OSes, system components, etc.). In some embodiments, machine learning techniques are used, such as a multivariate logistic regression prediction framework that co-relates software updates with the current state or configuration of the computing devices to provide proactive advice or recommendations on whether software updates are likely to cause compatibility issues for the computing devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing software by assessing the compatibility of software updates will now be described in greater detail with reference to FIGS. 9 and 10. Although described in the context of system 100, these platforms may also be used to implement at least portions of other information processing systems in other embodiments.

Figure 9:
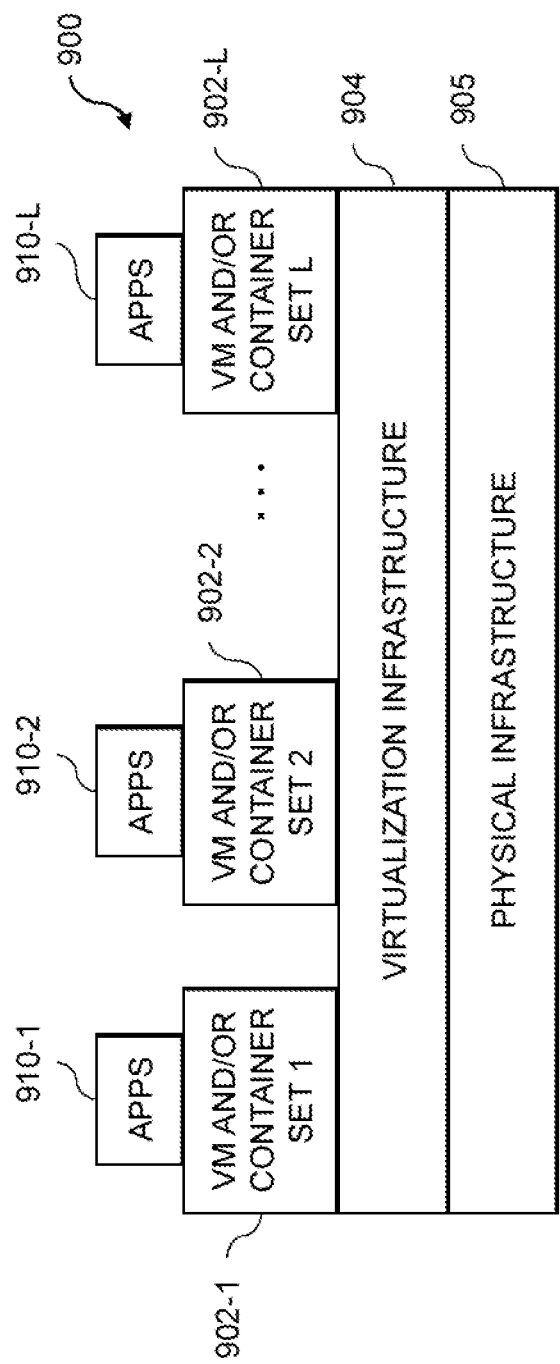
FIGS. 9 and 10 show examples of processing platforms that may be utilized to implement at least a portion of an information processing system in illustrative embodiments.
Figure 10:
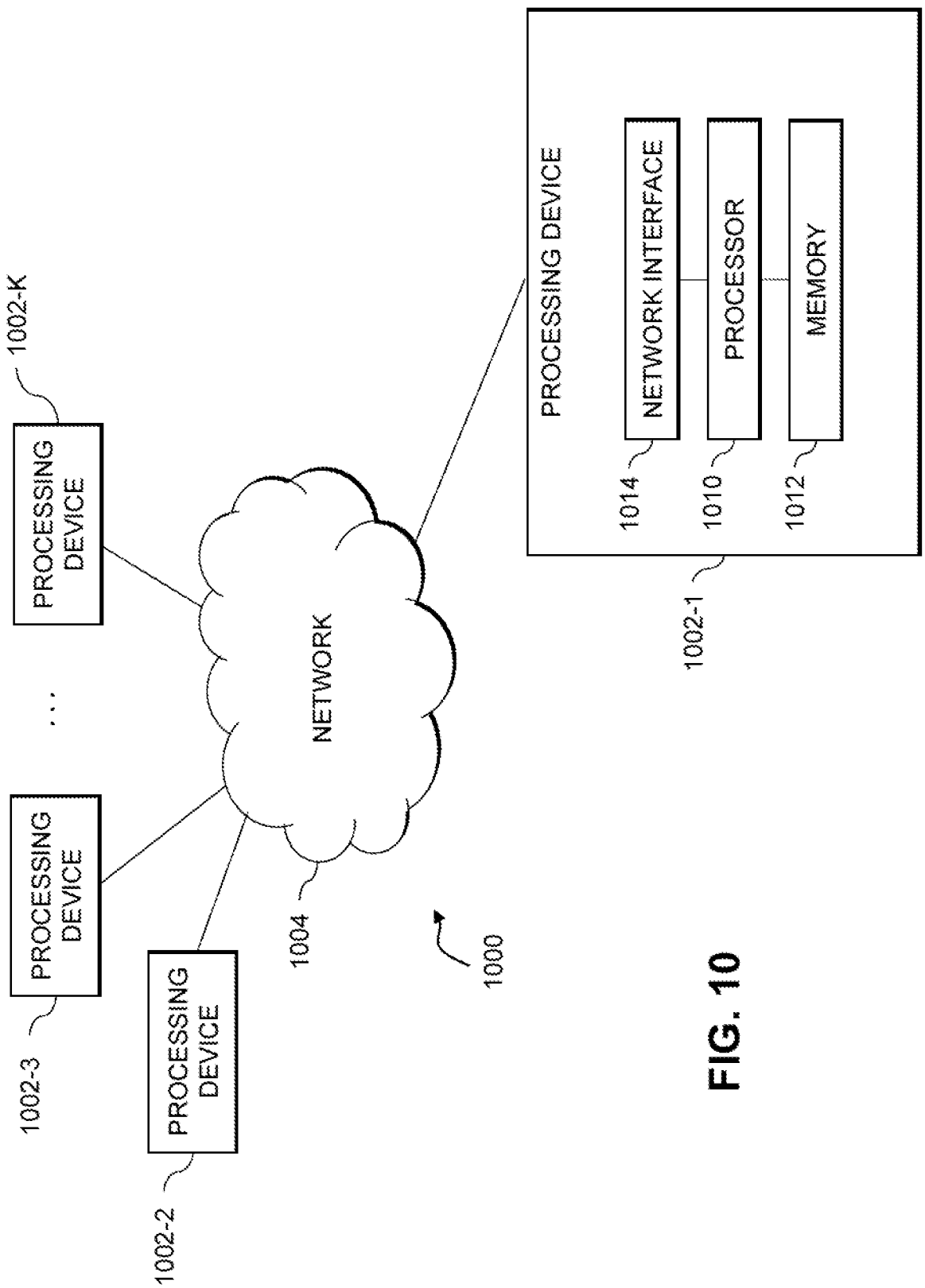

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing software by assessing the compatibility of software updates as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, software, machine learning algorithms, classifiers, classes, features, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising: at least one processing device comprising a processor coupled to a memory; the at least one processing device being configured to perform steps of: identifying at least one software update available for a given computing device; determining a state of the given computing device; utilizing a machine learning-based predictive model to assess compatibility of the at least one software update with the given computing device based at least in part on the state of the given computing device, the machine learning-based predictive model being trained utilizing historical incident data for a plurality of incidents associated with application of software updates to a plurality of computing devices; generating a recommendation notification indicating compatibility of the at least one software update with the given computing device, wherein generating the recommendation notification comprises selecting a type of visual indicator based at least in part on the assessed compatibility indicating that the at least one software update has at least a designated threshold probability of affecting operation of the given computing device; and providing the recommendation notification in conjunction with presentation of one or more user interface features controlling whether to apply the at least one software update to the given computing device, wherein providing the recommendation notification in conjunction with presentation of the one or more user interface features controlling whether to apply the at least one software update to the given computing device comprises displaying the visual indicator; wherein the designated threshold probability is dynamically adjusted based at least in part on one or more characteristics of the at least one software update.

2. The apparatus of claim 1 wherein the at least one software update comprises at least one of: installing new software, upgrading existing software, patching existing software, removing existing software, and replacing existing software with different software.

3. The apparatus of claim 1 wherein the at least one software update is for at least one of an operating system of the given computing device, a system component of the given computing device, a device driver of the given computing device, and an application installed on the given computing device.

4. The apparatus of claim 1 wherein identifying the at least one software update available for the given computing device comprises receiving at least one software update notification from a software provider indicating that the at least one software update is available and compatible with a device model of the given computing device.

5. The apparatus of claim 1 wherein determining the state of the given computing device comprises collecting information regarding at least one of:
   one or more processes running on the given computing device;
   software installed on the given computing device; and
   hardware installed for the given computing device.

6. The apparatus of claim 1 wherein determining the state of the given computing device comprises collecting information regarding at least one of:
   central processing unit utilization by the given computing device;
   memory utilization by the given computing device;
   storage utilization by the given computing device;
   network utilization by the given computing device.

7. The apparatus of claim 1 wherein the machine learning-based predictive model comprises a multi-variate logistic regression classifier.

8. The apparatus of claim 7 wherein the multi-variate logistic regression classifier is configured to assign a classification to an incident comprising application of a software update to an associated computing device based at least in part on a set of two or more features representing the state of the associated computing device.

9. The apparatus of claim 1 wherein the visual indicator comprises a user interface feature which, when selected, provides information regarding the assessed compatibility of the at least one software update with the given computing device.

10. The apparatus of claim 1 wherein the visual indicator comprises a warning indicator responsive to the assessed compatibility of the at least one software update with the given computing device having at least the designated threshold probability of negatively affecting operation of the given computing device.

11. The apparatus of claim 1 wherein the one or more characteristics of the at least one software update comprise one or more of:
   a severity of the at least one software update;
   a criticality of the at least one software update; and
   an importance of software that is updated by the least one software update.

12. The apparatus of claim 1 wherein the recommendation notification is provided to the given computing device.

13. The apparatus of claim 1 wherein the recommendation notification is provided to an additional computing device of a user responsible for managing software of the given computing device.

14. A computer program product comprising a non-transitory processor-readable storage medium having stored therein program code of one or more software programs, wherein the program code when executed by at least one processing device causes the at least one processing device to perform steps of: identifying at least one software update available for a given computing device; determining a state of the given computing device; utilizing a machine learning-based predictive model to assess compatibility of the at least one software update with the given computing device based at least in part on the state of the given computing device, the machine learning-based predictive model being trained utilizing historical incident data for a plurality of incidents associated with application of software updates to a plurality of computing devices; generating a recommendation notification indicating compatibility of the at least one software update with the given computing device, wherein generating the recommendation notification comprises selecting a type of visual indicator based at least in part on the assessed compatibility indicating that the at least one software update has at least a designated threshold probability of affecting operation of the given computing device; and providing the recommendation notification in conjunction with presentation of one or more user interface features controlling whether to apply the at least one software update to the given computing device, wherein providing the recommendation notification in conjunction with presentation of the one or more user interface features controlling whether to apply the at least one software update to the given computing device comprises displaying the visual indicator; wherein the designated threshold probability is dynamically adjusted based at least in part on one or more characteristics of the at least one software update.

15. The computer program product of claim 14 wherein the machine learning-based predictive model comprises a multi-variate logistic regression classifier, the multi-variate logistic regression classifier being configured to assign a classification to an incident comprising application of a software update to an associated computing device based at least in part on a set of two or more features representing the state of the associated computing device.

16. A method comprising steps of: identifying at least one software update available for a given computing device; determining a state of the given computing device; utilizing a machine learning-based predictive model to assess compatibility of the at least one software update with the given computing device based at least in part on the state of the given computing device, the machine learning-based predictive model being trained utilizing historical incident data for a plurality of incidents associated with application of software updates to a plurality of computing devices; generating a recommendation notification indicating compatibility of the at least one software update with the given computing device, wherein generating the recommendation notification comprises selecting a type of visual indicator based at least in part on the assessed compatibility indicating that the at least one software update has at least a designated threshold probability of affecting operation of the given computing device; and providing the recommendation notification in conjunction with presentation of one or more user interface features controlling whether to apply the at least one software update to the given computing device, wherein providing the recommendation notification in conjunction with presentation of the one or more user interface features controlling whether to apply the at least one software update to the given computing device comprises displaying the visual indicator; wherein the designated threshold probability is dynamically adjusted based at least in part on one or more characteristics of the at least one software update; and wherein the method is performed by at least one processing device comprising a processor coupled to a memory.

17. The method of claim 16 wherein the machine learning-based predictive model comprises a multi-variate logistic regression classifier, the multi-variate logistic regression classifier being configured to assign a classification to an incident comprising application of a software update to an associated computing device based at least in part on a set of two or more features representing the state of the associated computing device.

18. The computer program product of claim 14 wherein the one or more characteristics of the at least one software update comprise one or more of:
    a severity of the at least one software update;
    a criticality of the at least one software update; and
    an importance of software that is updated by the least one software update.

19. The method of claim 16 wherein the visual indicator comprises a warning indicator responsive to the assessed compatibility of the at least one software update with the given computing device having at least the designated threshold probability of negatively affecting operation of the given computing device.

20. The method of claim 16 wherein the one or more characteristics of the at least one software update comprise one or more of:
    a severity of the at least one software update;
    a criticality of the at least one software update; and
    an importance of software that is updated by the least one software update.

\* \* \* \* \*